United States Patent [19]
Kruger et al.

[11] Patent Number: 5,768,344
[45] Date of Patent: Jun. 16, 1998

[54] METHOD AND APPARATUS FOR SCREENING TELEPHONE CALLS IN RESPONSE TO AN ANSWERING DEVICE BEEP TONE

[75] Inventors: Frederick M. Kruger, Commack, N.Y.; Richard Leifer, 11 Beaumont Dr., Melville, N.Y. 11747

[73] Assignee: Richard Leifer, Melville, N.Y.

[21] Appl. No.: 557,447

[22] Filed: Nov. 14, 1995

Related U.S. Application Data

[63] Continuation-in-part of Ser. No. 399,730, Mar. 7, 1995, abandoned.

[51] Int. Cl.$^6$ ............................................. H04M 1/64
[52] U.S. Cl. .................... 379/35; 379/67; 379/70; 379/74; 379/217
[58] Field of Search .................... 379/67, 88, 89, 379/70, 77, 82, 217, 374, 388, 442, 211, 212, 210, 74, 35

[56] References Cited

U.S. PATENT DOCUMENTS

| | | | |
|---|---|---|---|
| 3,793,487 | 2/1974 | Kilby | 379/77 |
| 3,811,012 | 5/1974 | Barber | 379/217 |
| 4,069,397 | 1/1978 | Hashimoto | 379/77 |

*Primary Examiner*—Krista Zele
*Assistant Examiner*—Scott Wolinsky
*Attorney, Agent, or Firm*—Collard & Roe, P.C.

[57] ABSTRACT

A remote audio monitor for use with a telephone answering device connected to a common telephone line enables the screening of an incoming telephone call from a remote location with respect to the answering device. The remote audio monitor monitors the changing DC voltage levels of the telephone line following the ring signal and the answering of the incoming call, and activates when the answering device has generated a beep tone on the telephone line to indicate recording of an incoming message. Upon the proper sequence of the desired events, the remote audio monitor activates a loudspeaker and broadcasts the received message in real time at a location remote from the answering device. More than one remote audio monitor can be connected to the telephone line to provide simultaneous independent monitoring from various remote locations with respect to the answering device.

20 Claims, 1 Drawing Sheet

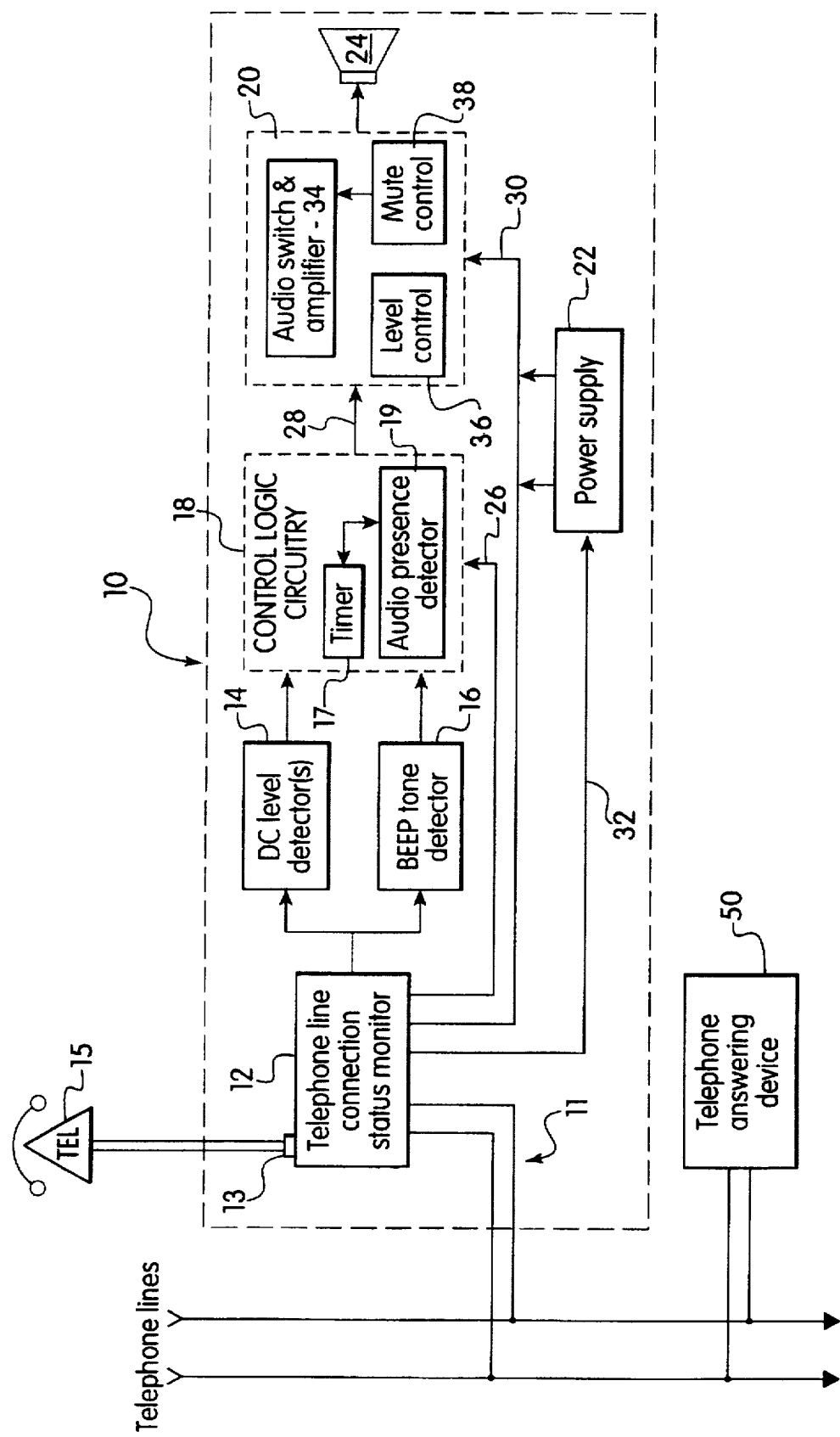

METHOD AND APPARATUS FOR SCREENING TELEPHONE CALLS IN RESPONSE TO AN ANSWERING DEVICE BEEP TONE

This application is a Continuation-In-Part of U.S. patent application Ser. No. 08/399,730, filed Mar. 7, 1995 now abandon.

BACKGROUND OF THE INVENTION

1. Field of the Invention

The present invention relates to answering devices. More particularly, it relates to the remote audio monitoring of answering devices for screening calls from remote locations within the same home or office.

2. The Prior Art

Telephone answering devices for taking phone messages are presently in wide spread use throughout the world. A large number of users of these answering devices use them to screen the incoming calls. The user, however, must be physically near the device in order to hear the spoken message and determine if they want to speak with the caller at that time.

The patent to Chace, U.S. Pat. No. 5,172,410, discloses a conference telephone system and method. The invention consists of a speaker telephone having a microphone and loudspeaker, and includes self-adjusting hybrid circuitry.

The patent to Alcaide, U.S. Pat. No. 4,184,048, discloses a system of audio-conference by telephone link up. The invention consists of a system whereby a plurality of remotely located groups can be connected in a conference call arrangement. The system provides a loudspeaker centrally disposed among each group, a group speaker with a microphone assembly for receieving their speech and an identification device.

The patent to Hamer, U.S. Pat. No. 4,899,378, discloses a telephone announcement system. The system is adaptable to existing two wire subscriber lines and consists of placing speaker boxes anywhere along a telephone line. These speaker (announcement) boxes are then activated in a receive-only announcement mode by the user by pressing one of the existing keys on a DTMF touch pad-equipped telephone. Once activated, the user then may speak into the phone and announce a message at all of the speakers. The system is then deactivated by pressing another of the keys on the DTMF keypad. This system adds an intercom feature to an ordinary phone line. The system in user-controlled, and operates independently from the normal switch and hook operation of the phone.

The patent to Phillips et al., U.S. Patent No. 4,748,663, discloses a loudspeaking telephone instrument. The invention consists of a loudspeaking telephone utilizing a microphone, a pair of comb filters and a frequency shifter.

The patent to Wallen, Jr., U.S. Pat. No. 5,157,712, discloses a telephone nuisance call mitigation screening device. This patent relates to automatic screening of callers via digital codes. The speaker described is electrically coupled to the answering machine, and the system operates with all telephone and answering machine ringers disabled. When an incoming call is received, the caller is prompted to input a secret code to activate the ringer at the callee's end. If the caller does not have secret code, the system will enable the caller to leave a message on the answering machine without enabling the ringer.

The patent to Hashimoto, U.S. Pat. No. 4,069,397, discloses an automatic telephone answering device. The device activates a connected amplifier/loudspeaker for several seconds to facilitate caller screening. The patent describes a method of activating a proximally located loudspeaker for several seconds, only during the first part of a predetermined time interval. The patent indicates that prearranged audible signals may be used to alert the called party during the several second interval the speaker is active. An optional remote speaker is activated by a signal transmitted from the calling party. This can activate a buzz signal.

According to Hashimoto, the local and/or remote speaker is wired to the answering machine. In one case, audio is only present for a few seconds. In another case, the caller turns on the speaker for a few seconds, and in all cases the audio output amplifier and signaling devices are directly wired to the answering device. The described remote amplifier is tethered to the answering device by audio, control and/or power leads.

Hashimoto depends upon active control of the speaker by the caller or, the speaker is activated each time there is a call and the audio is only present for several seconds. The called party must pick up a handset to monitor the full message. Thus, no provision is made for a fully remotely located audio monitor which is not connected to the answering device.

The systems of the prior art require specialized equipment for both parties involved in the communication, caller or callee intervention, or specific telephone subscriber services in order to operate accordingly.

SUMMARY OF THE INVENTION

The present invention provides a remote audio monitor for use with answering devices that allows the user to screen telephone calls from one or many different remote locations with respect to the answering device itself. The invention overcomes the shortfalls of the prior art by providing a device which does not require either party of the communication to have specialized equipment or intervene during the received call, or require the user to subscribe to specific telephone services.

According to the invention, a telephone line connection status monitor connects the remote audio monitor to the telephone line via the telephone wall jack. Detection circuits detect changes in the electrical state of the telephone line (AC and DC), in addition to detecting the presence of a BEEP tone generated by the answering device connected to the same telephone line. Control logic circuitry connected to the detection circuits and telephone line connection status monitor contains timer circuitry and audio presence monitoring circuitry. The audio presence monitoring circuitry senses the presence of an audio signal on the telephone line, and enables the deactivation of the device when the calling party hangs up, a telephone instrument connected to the telephone line goes off line after the termination of an initially present speech signals or after a predetermined period of time has lapsed. A loudspeaker, within the remote audio monitor device, broadcasts the received message in real time at the remote location from the answering device. The remote audio monitor provides manual options such as volume control, muting and audio switching to turn the device on and off. More than one remote audio monitor can be connected to the telephone line at various different locations to enable the simultaneous screening from multiple remote locations with respect to the answering device.

It is an object of the present invention to provide a remote audio monitor that can be connected to any existing telephone line having an answering device connected thereto.

3

It is another object of the invention to provide a remote audio monitor that allows an incoming call to be screened from one or more remote location within the same home or office with respect to the answering device location.

It is yet another object of the invention to provide a remote audio monitor which requires no user intervention for activation or deactivation.

It is yet another object of the invention to provide a remote audio monitor which operates on either a touch tone or pulse service telephone line.

Another object of the invention is to provide a remote audio monitor that is manufactured with ease and operates efficiently and reliably.

BRIEF DESCRIPTION OF THE DRAWINGS

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention.

The Figure shows a block diagram of the remote audio monitor in combination with a telephone answering device according to the invention.

DETAILED DESCRIPTION OF PREFERRED EMBODIMENTS

Before turning to the detail of the drawing, the operation of the remote audio monitor of the invention is described. In order to activate (i.e., turn on the audio) the telephone line connected remote audio monitor, three conditions must be met. Specifically: 1) a ring signal (i.e., an AC voltage of approximately 50 volts, or more, must first occur on the telephone line); 2) the ring signal must be followed by a change in the phone line DC level from its nominal "on-hook" level of 48 volts, to its "off-hook" level of less than 10 volts; and, 3) the occurrence of a valid BEEP tone on the active telephone line must be detected. In the preferred embodiment, these three conditions must be met in the specified order, and the remote audio monitor will enable the broadcast of the received message at the remote location. However, the performance of these three conditions and detection thereof may be performed and processed differently resulting in the broadcast of the received message.

Turning now in detail to the drawing, the FIGURE shows a block diagram of the remote audio monitor 10 according to the invention. Remote audio monitor 10 has a telephone line connection status monitor 12 connected to a telephone line via telephone connection wire 11 and a telephone modular jack (not shown). The telephone line connection status monitor 12 monitors the present status of the telephone line through telephone connection wire 11.

Telephone line connection status monitor 12 responds to the presence or absence of DC voltage between the input connection wires and, thereby, confirms connection to an active telephone line. Upon confirmation of an active line, monitor 12 enables, and powers up the remainder of the circuitry via connection line 32 to power supply 22. It would therefore function to reduce demand on an optional battery power supply.

A DC level detector 14 is connected to telephone line connection status monitor 12, and detects a drop in the DC voltage of the telephone line caused by the answering of a telephone call, either manually by the user at telephone 15

4 or by answering device 50. When the telephone handset of telephone 15 is taken offhook to make an outgoing call, the DC level on the phone line drops from its nominal 48 volts to a level below approximately 10 volts. Since the telephone is "originating" the call, no ring signal preceded the change in the telephone line DC level. Therefore, the "telephone ring" status would not change, and the corresponding control logic parameter would not be set. Thus, there cannot be an accidental activation of the remote audio monitor without the presence of a ring signal detected before the drop in DC line level, and therefore outgoing telephone calls will not be monitored.

A BEEP tone detector 16 is also connected to telephone line connection status monitor 12 to detect the presence of a BEEP tone generated on the telephone line connected wire 11 by the answering device after the outgoing message is played. BEEP tone detector 16 is a narrow band tone filter/detector, and is connected in such a way as to monitor the audio coming into the remote audio monitor 10 via the connected telephone line. The narrow band tone filter/detector would have, for example, a nominal 1,000 Hz center frequency. Thus, when the "BEEP" tone is present for a predetermined period of time, such as, for example, 30 milliseconds, the filter/detector locks to the signal and generates a change in its DC output level. This signals a valid tone status (occurrence).

The BEEP frequencies generated by answering devices vary depending on the manufacturer and type of device. Thus, the BEEP tone frequency range of the BEEP tone detector is broad enough to include a wide spectrum of frequencies. For example, the frequency range may be 300 Hz–3 KHz.

When the telephone quality speech containing frequencies from about 300 Hz to 3 KHz is present, BEEP tone detector 16 does not respond to the momentary presence of any single speech frequency. In addition, since the detection of the BEEP tone only occurs after the detection of the "ring signal," even if a touchtone frequency component caused a false signal detect and the setting of a "valid tone" parameter, the device would not be activated. BEEP tone detector 16 serves to prevent the broadcast of the message at the remote audio monitors when the telephone is manually taken off-hook by the user. This is due to the fact that if the user picks up the phone, the sequence of desired events will be interrupted, and the BEEP tone will not be generated, or will be generated out of order. Thus, the remote audio monitor will not be activated.

Control logic circuitry 18 receives signals from DC level detector(s) 14, BEEP tone detector 16, telephone status monitor 12, timer 17 and audio presence detector 19. Connection line 26 connects monitor 12 with control logic circuitry 18 and provides a "ring signal" status and audio to said control logic circuitry. Control logic circuitry 18 includes audio presence detector 19 for determining the presence of an audio signal on the telephone line via connector line 26, and timing circuitry 17 having a predetermined time out period(s). Audio presence detector 19 takes an incoming audio signal and converts it to a varying DC voltage. This varying DC voltage is connected to an internal integrating storage element and then to a level sensitive element which changes its logical status when a predetermined input voltage level is exceeded. When the voltage level drops below a second predetermined voltage level, which is lower than the first, the logic status is reset and the remote audio monitor reverts to its standby condition.

In operation, speech on the telephone line will maintain the logic status in its active condition. When speech terminates, the DC voltage level on the storage element continues to decrease until it is below the predetermined level, thereby causing the logic status to revert to its standby condition. Thus, when audio presence detector 19, within circuitry 18, indicates that there is no longer an audio signal present on the telephone line, timer circuit 17 begins and continues to count for the predetermined time period. If the time period lapses, and no audio signal is present on the telephone line, control circuitry 18 disables the remote audio monitor and again awaits the signals from the detection circuits 14 and 16. Although shown separately, DC level detector 14 and BEEP tone detector 16 can be integrated into control circuitry 18 to decrease the component count and enable a more efficient design.

A loudspeaker 24, connected to control logic circuitry 18 via audio control 20, broadcasts the received message, in real time, to allow the screening of the incoming telephone call at the remote locations that have remote audio monitor 10. Audio control 20 is connected to control circuitry 18 via control line 28. Audio control 20 includes an audio switch and amplifier 34 for providing the necessary signal levels to loudspeaker 24, a manual level/loudness control 36 for adjusting the volume of the loudspeaker (audio), and a manually operated silence or muting control 38 for selectively disabling that particular remote audio monitor.

Remote Audio Monitor 10 has two external connections. The first is a multiconductor telephone wire 11 which typically connects to a six conductor modular plug (not shown). The modular plug preferably connects directly to remote audio monitor 10, or may otherwise be connected through a suitable adapter at one end, and to the telephone line (not shown) at its other end. The second external connection is used to bring optional electrical power to monitor 10. The power supply 22 may be either an external power adapter of various construction, or an internal battery power pack module.

In order to operate properly and correctly discriminate against outgoing calls and extraneous signals on the telephone line transmitted through wire 11, four types of information existing at various times on the telephone line are monitored. Specifically, a ring signal (AC voltage on the line), DC levels on the telephone line, a BEEP tone, and audio on the telephone line. The information is carried via the telephone line connection status monitor 12 to the DC level detector 14, BEEP tone detector 16, and control logic circuitry 18. Control logic 18 detects the presence of telephone ring signals and speech audio on the phone line via connector line 26.

The telephone line connection status monitor 12 provides a logic level signal indication to control logic circuitry 18 and power supply 22 that a valid connection to the telephone line exists. Monitor 12 also provides logic levels indicating the presence of valid telephone ring signals and speech to the control logic module 18 via line 26. DC level detectors 14 monitors voltage levels on the telephone line connected through wire 11 and provides control logic circuitry 18 with the status information. The BEEP tone detector 16 provides narrow band filtering and tone detection, and may also provide part of the BEEP tone duration timing function. The output of the BEEP tone detector 16 is a logic level signal which is connected to the control logic circuitry 18, and indicates the existence of a valid BEEP tone signal.

The control logic circuitry 18 responds to the occurrence of valid logic levels, in the correct sequence and for the required durations. When the various logic signals indicate that the correct events have occurred in the desired sequence, and for the require duration, control logic circuitry 18 provides a control signal via line 28 to audio control 20. Upon receipt of the enabling control signal, audio control 20 connects the telephone line audio from the monitor 12 to its audio amplification circuits via connection line 30, to loudspeaker 24 contained with the remote audio monitor.

Once remote audio monitor 10 is activated and broadcasting, it can be deactivated upon the occurrence of any one of four different events. First, DC level detectors 14 senses a further telephone line voltage drop of 0.5 volts or more from its below 10 volts "off-hook" level. This is caused by the receiver/callee picking up a telephone handset of a telephone instrument connected to the telephone line. This status change is communicated to the control logic circuitry 18 via connected logic lines. Upon receipt of this "second device off-hook valid" status, control logic circuitry 18 disconnects the telephone line audio via line 30, from the audio control circuitry 20, and resets the various valid logic flags, thereby deactivating the remote audio monitor.

Second, when DC level detector(s) 14 senses a telephone line voltage increase to its nominal 48 volt level, that status change is communicated to the control logic circuitry 18 via connected logic lines. This is caused by the caller hanging up the phone to terminate the call. Upon receipt of this "on-hook" valid status, control logic circuitry 18 disconnects the telephone line audio via line 30, from the audio control 20, and resets the various valid logic flags, thereby deactivating the remote audio monitor.

Third, when the watchdog timer and audio presence monitor within control logic circuitry 18 determine that no valid audio has been present on the telephone line for the predetermined time interval. This is caused by the caller hanging up the phone to terminate the call. Upon this occurrence, the appropriate logic within control logic circuitry 18 disconnects the telephone line audio from the audio circuits circuitry 20, and resets the various valid logic flags, thereby deactivating the remote audio monitor.

Fourth, if control logic circuitry 18 detects a valid Touch-tone™ tone pair of a predetermined sequence or value, it disconnects the telephone line audio from the audio amplification and output circuitry within audio control 20, resets the various valid logic flags, and causes the remote audio monitor to revert to its standby state. In addition to the automatic deactivation functions described, remote audio monitor 10 contains a push button-type control for manually disabling the audio monitor function.

Upon the occurrence of any of the four deactivation events, the remote audio monitor is placed in its standby, or quiescent state again, and awaits valid status indications from the telephone line.

The internal logic and control functions of the remote audio monitor may be implemented using either discrete component, microprocessor based, or other advanced technologies.

The remote audio monitor of the invention does not require a specific type of subscriber service on the telephone line to operate properly. Thus, the system will operate on either a touch tone or pulse telephone line. The remote audio monitor only requires an answering device to be connected to the telephone line.

In a second embodiment of the invention, connection status monitor 12 has a connecting jack 13 wired to telephone line connection wires 11 for coupling a telephone instrument to remote audio monitor 10. This will enable the connection of the remote audio monitor with the telephone line and a telephone instrument when only one telephone access point or connection is present. A telephone instrument may be a caller ID device or any other device that connects to a telephone line. It is important to note, however, that a plurality of remote audio monitors 10 can be connected to the same telephone line at various remote locations and they need not have a telephone connected to them to operate properly.

While two embodiments of the present invention have been shown and described, it is to be understood that many changes and modifications may be made thereunto without departing from the spirit and scope of the invention as defined in the appended claims.

What is claimed is:

1. A remote audio monitor in combination with a telephone answering device, the remote audio monitor and telephone answering device being connected to a common telephone line, the combination comprising:

a telephone answering device for answering an incoming telephone call, said answering device playing an outgoing message upon receipt of the incoming call and generating a beep tone on the telephone line to indicate the start of recording of an incoming message; and a remote audio monitor for broadcasting the incoming message at a remote location from the answering device in response to detection of said beep tone.

2. The combination according to claim 1, wherein said remote audio monitor comprises:

i. connection means for connecting the remote audio monitor to a telephone line;

ii. detection means coupled to said connection means for detecting changes in the electrical state of the telephone line in response to the answering device answering an incoming call, and detecting a beep tone generated on the telephone line by the answering device;

iii. control logic circuitry connected to said detection means;

iv. an audio control unit connected to said control logic circuitry and having a speaker connected thereto, said audio control unit controlling the broadcast of an incoming message received by the answering device in real time and at a remote location from the answering device.

3. The remote audio monitor according to claim 2, further comprising power supply means coupled to said connection means, detection means, control logic circuitry and audio control unit, said power supply means being activated and deactivated by said connection means.

4. The remote audio monitor according to claim 3, wherein said connection means includes a telephone line connection status monitor for determining when the telephone line is active.

5. The remote audio monitor according to claim 3, wherein said detection means further comprises:

an AC voltage detector for detecting the occurrence of a ring signal on the telephone line;

one or more DC level detectors for detecting changes in the DC voltage levels on the telephone line; and a beep tone detector for detecting the presence of the beep tone generated by the answering device on the telephone line.

6. The remote audio monitor according to claim 3, wherein said control logic circuitry further comprises:

an audio presence monitor for detecting the presence of an audio signal on the telephone line; and a timing circuit for disabling the remote audio monitor after the lapse of a predetermined time period in response to the absence of an audio signal as indicated by said audio presence monitor.

7. The remote audio monitor according to claim 3, wherein said connection means further includes telephone connection means for connecting a telephone to the remote audio monitor.

8. The remote audio monitor according to claim 3, wherein said connection means further comprises at least one connection terminal for connecting additional telephone instruments.

9. A method of screening an incoming telephone call from a remote location with respect to the location of an answering device, the method comprising the steps of:

receiving an incoming telephone call on a telephone line;

answering the call with an answering device;

generating a beep tone on the telephone line to indicate the start of recording of an incoming message to the caller;

activating a remote audio monitor speaker connected to the telephone line in response to the presence of predetermined AC voltage levels, DC voltage levels, and beep tone events in proper sequence on the telephone line; and deactivating the remote audio monitor speaker when the call screening is complete.

10. The method according to claim 9, wherein said step of activating a remote audio monitor speaker is performed in response to the completion of said steps of receiving an incoming call, answering the call with an answering device, and generating the beep tone on the telephone line by an answering device.

11. The method according to claim 9, wherein said step of deactivating the remote audio monitor speaker comprises the step of:

disconnecting the remote audio monitor speaker from the telephone line in response to the absence of an audio signal on the teltphone line after a predetermined period of time.

12. The method according to claim 9, wherein said step of deactivating the remote audio monitor speaker comprises the step of:

disconnecting the remote audio monitor speaker from the telephone line in response to an increase in the DC voltage level on the telephone line to an "on hook" DC level.

13. The method according to claim 9, wherein said step of deactivating the remote audio monitor speakers comprises the step of:

removing a handset from any telephone connected to the telephone line.

14. The method according to claim 9, wherein said step of deactivating the remote audio monitor speaker comprises the step of depressing a predetermined key of a DTMF touch pad equipped telephone.

15. A method of screening an incoming telephone call from a remote location with respect to the location of an answering device, the method comprising the steps of:

detecting a ring signal indicating an incoming telephone call on a telephone line;

detecting a change in DC levels on the telephone line when the call is answered with an answering device;

detecting a beep tone on the telephone line to indicate the start of recording of an incoming message;

activating a remote audio monitor speaker connected to the telephone line in response to the presence of predetermined AC voltage levels, DC voltage levels and beep tone events in proper sequence on the telephone line; and deactivating the remote audio monitor speaker when the call screening is complete.

16. The method according to claim 15, wherein said step of activating a remote audio monitor speaker is performed in response to the completion of receiving an incoming call, answering the call with an answering device, and generating the beep tone on the telephone line by an answering device.

17. The method according to claim 15, wherein said step of deactivating the remote audio monitor speaker comprises the step of:

disconnecting the remote audio monitor speaker from the telephone line in response to the absence of an audio signal on the telephone line after a predetermined period of time.

18. The method according to claim 15, wherein said step of deactivating the remote audio monitor speaker comprises the step of:

disconnecting the remote audio monitor speaker from the telephone line in response to an increase in the DC voltage level on the telephone line to an "on hook" DC level.

19. The method according to claim 15, wherein said step of deactivating the remote audio monitor speaker comprises the step of:

removing a handset from any telephone connected to the telephone line.

20. The method according to claim 15, wherein said step of deactivating the remote audio monitor speaker comprises the step of depressing a predetermined key of a DTMF touch pad equipped telephone.

* * * * *